United States Patent
Bennett et al.

(10) Patent No.: US 10,543,626 B2
(45) Date of Patent: Jan. 28, 2020

(54) POLY(VINYL CHLORIDE) SUBSTRATES AND METHOD FOR PRODUCING THE SAME

(71) Applicant: Magma Flooring LLC, River Falls, WI (US)

(72) Inventors: Greggory S. Bennett, Hudson, WI (US); Vance Warren Zins, Hudson, WI (US); Todd Richard Sarnstrom, Ellsworth, WI (US); Christopher Jon Krueger, River Falls, WI (US); Daniel Lee Thron, Stillwater, MN (US)

(73) Assignee: Magma Flooring LLC, River Falls, WI (US)

( * ) Notice: Subject to any disclaimer, the term of this patent is extended or adjusted under 35 U.S.C. 154(b) by 0 days.

(21) Appl. No.: 15/575,758

(22) PCT Filed: May 20, 2016

(86) PCT No.: PCT/US2016/033516
§ 371 (c)(1),
(2) Date: Nov. 20, 2017

(87) PCT Pub. No.: WO2016/187532
PCT Pub. Date: Nov. 24, 2016

(65) Prior Publication Data
US 2018/0178420 A1    Jun. 28, 2018

Related U.S. Application Data

(60) Provisional application No. 62/164,201, filed on May 20, 2015.

(51) Int. Cl.
| | | |
|---|---|---|
| B32B 27/02 | (2006.01) | |
| B29C 43/22 | (2006.01) | |
| C08J 5/12 | (2006.01) | |
| B29C 43/48 | (2006.01) | |
| C08J 9/24 | (2006.01) | |
| B29K 27/06 | (2006.01) | |
| B29K 105/00 | (2006.01) | |

(52) U.S. Cl.
CPC ............ B29C 43/228 (2013.01); B29C 43/48 (2013.01); C08J 5/121 (2013.01); C08J 9/24 (2013.01); *B29C 2043/483* (2013.01); *B29K 2027/06* (2013.01); *B29K 2105/251* (2013.01); *C08J 2327/06* (2013.01)

(58) Field of Classification Search
CPC . B29C 2043/483; B29C 43/228; B29C 43/48; B29K 2027/06; B29K 2105/251; C08J 11/06; C08J 2327/06; C08J 5/121; C08J 9/24; Y02W 30/701
See application file for complete search history.

(56) References Cited

U.S. PATENT DOCUMENTS

| | | | |
|---|---|---|---|
| 2,371,868 | A | 3/1945 | Berg et al. |
| 3,668,179 | A | 6/1972 | Di Biasi et al. |
| 3,684,645 | A | 8/1973 | Temple et al. |
| 4,248,931 | A | 2/1981 | Salman |
| 4,547,421 | A | 10/1985 | Dunbar |
| 4,616,042 | A | 10/1986 | Avakian |
| 4,767,580 | A | 8/1988 | Shingo et al. |
| 4,793,956 | A | 12/1988 | Nogiwa et al. |
| 4,878,970 | A | 11/1989 | Schubert et al. |
| 5,118,532 | A | 6/1992 | Batson et al. |
| 5,219,163 | A | 6/1993 | Watson |
| 5,238,622 | A | 8/1993 | Grimmer |
| 5,351,895 | A | 10/1994 | Brooks et al. |
| 5,364,412 | A * | 11/1994 | Furukawa ............ B41M 5/0355 428/914 |
| 5,827,460 | A | 10/1998 | Brentrup et al. |
| 5,965,232 | A | 10/1999 | Vinod |
| 6,017,991 | A | 1/2000 | Drummond et al. |
| 6,068,715 | A | 5/2000 | Yokokita et al. |
| 6,153,674 | A | 11/2000 | Landin |
| 6,231,650 | B1 | 5/2001 | Mallow et al. |
| 6,271,270 | B1 | 8/2001 | Muzzy |
| 6,316,075 | B1 | 11/2001 | Desai et al. |
| 6,387,967 | B2 | 5/2002 | Muzzy |
| 6,572,697 | B2 | 6/2003 | Gleeson et al. |
| 6,620,487 | B1 | 9/2003 | Tonyan et al. |
| 6,743,742 | B1 | 6/2004 | LaRocco et al. |
| 6,872,246 | B2 | 3/2005 | Muller et al. |
| 6,907,708 | B2 | 3/2005 | Merkley et al. |
| 6,861,128 | B1 | 6/2005 | Naji et al. |

(Continued)

FOREIGN PATENT DOCUMENTS

| | | |
|---|---|---|
| CN | 102432959 A | 5/2012 |
| EP | 0651003 A1 | 5/1995 |

(Continued)

OTHER PUBLICATIONS

International Preliminary Report on Patentability for PCT Application No. PCT/US2016/033516, dated Nov. 30, 2017 (11 pgs).
International Search Report for PCT Application No. PCT/US2016/033516, dated Aug. 17, 2016 (2 pgs).
Written Opinion for PCT Application No. PCT/US2016/033516, dated Aug. 17, 2016 (9 pgs).
"ASTM E831-14: Standard Test Method for Linear Thermal Expansion of Solid Materials by Thermomechanical Analysis," Aug. 1, 2014 (5 pgs).

(Continued)

*Primary Examiner* — Lawrence D Ferguson
(74) *Attorney, Agent, or Firm* — Patterson Thuente Pedersen, P.A.

(57) ABSTRACT

Articles and methods of manufacture of poly(vinyl chloride)-based substrates are described. The substrates may be utilized in various consumer, industrial, transportation, building and construction, and agricultural applications and may include reclaimed poly(vinyl chloride).

14 Claims, 2 Drawing Sheets

(56) References Cited

U.S. PATENT DOCUMENTS

| | | | |
|---|---|---|---|
| 7,081,300 | B2 | 7/2006 | Laurence et al. |
| 7,241,818 | B2 | 7/2007 | Hemmings et al. |
| 7,361,401 | B2 | 4/2008 | Desai et al. |
| 7,455,798 | B2 | 11/2008 | Datta et al. |
| 7,763,345 | B2 | 7/2010 | Chen et al. |
| 8,106,105 | B2 | 1/2012 | Cernohous |
| 8,431,054 | B2 | 4/2013 | Pervan et al. |
| 2001/0028127 | A1 | 10/2001 | Hinds et al. |
| 2002/0025414 | A1 | 2/2002 | Desai et al. |
| 2002/0031653 | A1 | 3/2002 | Ricciardelli et al. |
| 2005/0020747 | A1 | 1/2005 | Symons |
| 2005/0124763 | A1 | 6/2005 | Mikami et al. |
| 2005/0166513 | A1 | 8/2005 | Vanderhoef |
| 2006/0019078 | A1 | 1/2006 | Osten et al. |
| 2006/0142455 | A1 | 6/2006 | Agarwal et al. |
| 2007/0020747 | A1 | 2/2007 | Sigworth et al. |
| 2007/0027234 | A1 | 2/2007 | Sigworth et al. |
| 2008/0001429 | A1 | 1/2008 | Willis |
| 2008/0187739 | A1 | 8/2008 | Baker et al. |
| 2008/0207831 | A1 | 8/2008 | Feinberg |
| 2008/0287576 | A1 | 11/2008 | Nichols et al. |
| 2010/0010141 | A1 | 1/2010 | Nakamura et al. |
| 2010/0030003 | A1 | 12/2010 | Pervan et al. |
| 2011/0177308 | A1 | 7/2011 | Anderson et al. |
| 2012/0059074 | A1 | 3/2012 | Adkinson et al. |
| 2012/0070646 | A1 | 3/2012 | Ha et al. |
| 2012/0135203 | A1 | 5/2012 | Albert et al. |
| 2013/0147090 | A1 | 6/2013 | Schromm et al. |
| 2013/0189511 | A1 | 7/2013 | Cernohous et al. |
| 2015/0065974 | A1 | 3/2015 | Michiels et al. |
| 2015/0152650 | A1 | 6/2015 | Cernohous |

FOREIGN PATENT DOCUMENTS

| | | |
|---|---|---|
| EP | 0794214 A2 | 9/1997 |
| EP | 2339092 A1 | 6/2011 |
| EP | 2754688 A1 | 7/2014 |
| JP | 510098798 a | 8/1976 |
| JP | 04236246 A | 8/1992 |
| JP | H6-508567 | 9/1994 |
| JP | 2002-322810 | 8/2002 |
| JP | 2004-292653 A | 10/2004 |
| JP | 2005-082802 A | 3/2005 |
| SU | 1775425 | 11/1992 |
| WO | WO 01/98064 A2 | 12/2001 |
| WO | WO 2007/102825 A1 | 9/2007 |
| WO | WO 2008/094529 A1 | 8/2008 |
| WO | WO 2009/134403 A1 | 11/2009 |
| WO | WO 2012/001091 A1 | 1/2012 |
| WO | WO 2012/016916 A1 | 2/2012 |
| WO | WO 2013/181379 A1 | 12/2013 |
| WO | WO 2013/1796260 A1 | 12/2013 |
| WO | WO 2014/207308 A1 | 12/2014 |
| WO | WO 2016/115556 A1 | 7/2016 |

OTHER PUBLICATIONS

"Polyvinyl Chloride (PVC) Typical Properties Generic PVC, Rigid l UL Prospector," Jan. 6, 2015, XP055502548, Retrieved from the Internet: URL: https://web.archive.org/web/20150106145449/http://plastics.ulprospector.com:80/generics/46/c/t/polyvinyl-chloride-pvc-properties-processing/sp/8 [retrieved on Aug. 28, 2018].
"Composite Solutions, Reinforcement Guide: Transforming the World with Advanced Solutions," Mar. 1, 2011, XP 055508480, Toledo, Ohio, 43659; Retrieved from the Internet: <URL:http://www.ocvreinforcements.com/pdf/library/Composite_Solutions_Guide_10 0360_Efinalprintable.pdf> [retrieved on Sep. 20, 2018] (128 pgs).
Chinese Office Action for Application No. 201380027887.7, dated Jan. 29, 2016 (8 pgs).
CN OA for App No. 201680041873.4, dated Jan. 11, 2019; Translation—6 pgs.
EP Communication for Application No. 13 796 809.5-1303 pursuant to Article 94(3) EPC, dated Aug. 17, 2017 (7 pgs).
EP Communication for Application No. 13796809.5, dated Aug. 17, 2017.
European Response for Application No. 13 796 809.5-1303, filed Feb. 27, 2018 (6 pgs).
European Response for Application No. 13 796 809.5-1303, filed Jul. 11, 2016 (27 pgs).
European Response for Application No. 16738034.4, filed Apr. 24, 2019 (6 pgs).
Extended European Search Report for Application No. 13 796 809.5-1303, dated Dec. 15, 2016 (9 pgs).
Extended European Search Report for Application No. 16797376.7, dated Dec. 7, 2018 (11 pgs.).
Extended European Search Report for European Application No. 16738034.4, dated Sep. 28, 2018 (12 pgs).
International Preliminary Report on Patentability for PCT Application No. PCT/US2013/043342, dated Dec. 2, 2014 (7 pgs).
International Preliminary Report on Patentability in International Application No. PCT/US2016/013797, dated Jul. 18, 2017 (9 pgs).
International Search Report and Written Opinion for Application No. PCT/US2013/043342, dated Aug. 27, 2013 (9 pgs).
International Search Report and Written Opinion for Application No. PCT/US2016/56067, dated Dec. 23, 2016 (12 pgs).
International Search Report for PCT Application No. PCT/US2013/043342, dated Aug. 17, 2013 (3 pgs).
International Search Report in International Application No. PCT/US2016/013797, dated Jul. 1, 2016 (3 pgs).
IPRP for Application No. PCT/US2016/56067, dated Apr. 19, 2018 (7 pgs).
Partial supplementary European search report for Application No. 16797376.7, dated Sep. 5, 2018 (16 pgs.).
Naranjo C. et al., "Thermal Properties" in Plastics Testing and Characterization, Industrial Applications, Nov. 1, 2012, Hanser Fachbuchverlag, Munchen, XP 055508349, ISBN: 978-3-446-41315-3, Title page, pp. 88-94, and Abstract (10 pgs).
Office Action for U.S. Appl. No. 12/523,819, dated Sep. 28, 2011 (4 pgs).
Response as filed in Application No. 13796809.5, dated Feb. 27, 2018.
Response as filed in Application No. 13796809.5, dated Jul. 11, 2016.
Response to CN OA dated Jan. 29, 2016 for Application No. 201380027887.7, no date indicated (12 pgs).
Second Chinese Office Action for Application No. 201380027887.7, no date indicated (7 pgs).
Supplementary European Search Report, Application No. 13 796 809.5-1303, dated Dec. 8, 2015 (2 pgs).
Written Opinion for PCT Application No. PCT/US2013/043342, dated Aug. 27, 2013 (6 pgs).
Written Opinion in International Application No. PCT/US2016/013797, dated Jul. 1, 2016 (8 pgs).
Chinese Office Action for Application No. 201680041873.4, dated Jan. 11, 2019 (6 pgs).

* cited by examiner

POLY(VINYL CHLORIDE) SUBSTRATES AND METHOD FOR PRODUCING THE SAME

RELATED APPLICATIONS

The present application claims priority to PCT Application No. PCT/US2016/033516, entitled POLY(VINYL CHLORIDE) SUBSTRATES AND METHOD FOR PRODUCING THE SAME, filed May 20, 2016, and claims the benefit of U.S. Provisional Application No. 62/164,201, filed May 20, 2015, which are both hereby incorporated herein by reference in their entirety.

TECHNICAL FIELD

Articles and methods of manufacture of substrates derived from poly(vinyl chloride) compounds and reclaimed poly(vinyl chloride) compounds. The substrates may be utilized in various consumer, industrial, transportation, building and construction, flooring, and agricultural applications and more particularly ceiling tile and recreational vehicle applications.

BACKGROUND

Poly(vinyl chloride) ("PVC") is commonly utilized as a material of construction for consumer and industrial goods. PVC possesses the advantageous features of low cost, durability, moisture resistance, tailored stiffness, dimensional stability, and flame retardancy. Virgin PVC is readily processed into sheet, tubes, and other forms using conventional processing equipment such as extruders and thermal compression bonding equipment. The reported density of poly(vinyl chloride) is 1.45 g/cm$^3$.

Plasticizers can be added to PVC, which is known to be rigid in the absence of such additives, to make it more flexible and more suitable for an even broader range of applications, including but not limited to applications such as plumbing and electrical cable insulation. The addition of plasticizers and other such flexibilizing agents will lower the modulus and the density of the PVC.

The use of chemical and physical inert gas blowing agents can also be used to lower the density of PVC substrates.

While PVC is attractive for many first life commercial uses, the opportunities to reclaim and reuse PVC for subsequent future life applications are limited. The recycling of reclaimed PVC possesses inherent challenges due both to the processing difficulties caused by the various and often unknown additives and fillers that may have been used during the first life and to the sorting and separation of reclaimed PVC to generate a more homogenous raw material for use in future applications. Specifically, a significant amount of reclaimed PVC sources incorporate mixtures of other materials or components, for example pigments, colorants, fillers, plasticizers and the like, that limit PVC's potential reuse in future applications. Reclaimed PVC materials introduce feedstock variability for which conventional melt processing may be ill-suited and which limits the commercial utility for future life applications of PVC. This challenge becomes more acute as one tries to use a high fraction of reclaimed PVC within conventional processing methods.

SUMMARY

This disclosure is directed to a method for the continuous manufacture of poly(vinyl chloride) compound and reclaimed poly(vinyl chloride) compound substrates with controlled and desirable features. Various embodiments are directed to articles that include poly(vinyl chloride) compounds or reclaimed poly(vinyl chloride) compounds and methods of continuous manufacture that include a continuous double belt press. Certain embodiments of the articles and methods described represent an innovation to cost-effectively reclaim and reuse large amounts of poly(vinyl chloride) compound by engineering reclaimed poly(vinyl chloride) compound substrates to have controlled and desirable features including lower density, surface coloration, surface roughness, cupping, and combinations thereof. Moreover, certain embodiments of the articles and methods described may be used to simplify the process and reduce the cost of manufacturing poly(vinyl chloride) compound substrates to possess these same features and combinations thereof.

Reclaimed poly(vinyl chloride) compound and poly(vinyl chloride) compound may be well-suited to form substrates used in a variety of applications in the consumer, industrial, transportation, building and construction, flooring, and agricultural markets. In certain embodiments, the material is thermally compressed into a panel of desired flatness using processing equipment such as, for example, a continuous double belt press. In one embodiment, the poly(vinyl chloride) compound is spread as a particulate onto the lower belt of a continuous double belt press, thermally compressed to form a continuous panel of desired flatness in the downstream direction, and then subsequently divided into smaller panels. The substrates of this disclosure may be formed to serve various industries and end use applications. Various additives, plasticizers, lightweight fillers, polymers, or blends of different types of reclaimed PVC compound can be used as is known to those skilled in the art.

The following terms used in this application are defined as follows:

"Adhesive" means a substance that is used to join two substrates.

"Cellulosic Material" means natural or man-made materials derived from cellulose. Cellulosic materials include, for example: wood flour, wood fibers, sawdust, wood shavings, newsprint, paper, flax, hemp, grain hulls, kenaf, jute, sisal, nut shells, cork, or combinations thereof.

"Co-scattering" means that a first scattering unit applies particulate of poly(vinyl chloride) compound or reclaimed poly(vinyl chloride) compound onto the lower belt of a continuous double belt press. A second scattering unit then subsequently applies additional particulates of poly(vinyl chloride) compound or reclaimed poly(vinyl chloride) compound onto the first scattered particulates. The two scatterings of particulates may be different in composition, physical properties, aesthetics, or combinations thereof.

"Consolidated" or "Consolidation" means that a particulate material has been heated, with a controlled amount of time, temperature, and pressure, to enable flow of material and the formation of a substrate which is largely absent of air voids.

"Continuous Double Belt Press" means a thermal compression bonding process which comprises an upper and a lower continuous belt between which particulate material is formed into continuous sheets through control of time, pressure, temperature, and belt separation.

"Cupped" or "Cupping" describes a substrate which, when placed on a flat surface in the concave up orientation, shows a separation between the substrate and the flat surface of at least one (1) millimeter when measured at each of the four corners in a rectangular or square-shaped section of the substrate.

"Degree of Cupping" is reported as the average distance of separation in millimeters of the four corners of a test sample from a flat surface divided by 610 and converted to a percentage by multiplying by 100, wherein the test sample is 610 mm by 610 mm and measured at room temperature.

"Film" means a thin polymer or a thin paper, optionally possessing a desirable color, design, aesthetic feature, or wear-resistance feature.

"Feedstock" means a raw material that is introduced into a process, such as an extruder, compression or thermal compression molder, blender, mixer, or other process.

"First life" means the original article of manufacture made from a virgin material.

"Fused" means that a particulate material has been heated, with a controlled amount of time, temperature, and pressure, to enable flow and partial consolidation of particles such that the particles substantially lose their original shape while retaining up to 50% air voids within the resultant substrate as determined by calculating the volume fraction of each component in a two-component system wherein component 1 is PVC with a density of 1.45 g/cm$^3$ and component 2 is air with a density of zero.

"Fusing" means the method of creating a fused substrate.

"Lightweight Filler" means an organic or inorganic material with a specific gravity of less than 0.7 g/cm$^3$ and excluding foaming agents and structural elements to introduce voids.

"Naturally Occurring Inorganic Material" means an inorganic material that is found in nature, for example, volcanic ash or calcium carbonate.

"Non-Consolidated Surface" describes a rough surface of a substrate related to the presence of identifiable particulates which have substantially retained their particulate size and shape yet are connected to the substrate.

"Non-Homogeneous Color or Colored" means a substrate that possesses a controlled color or decorative pattern on one or both of its surfaces that is different from the color or pattern characterizing the bulk material comprising the substrate.

"Particulate" means a pellet, powder, granulate, or combinations thereof that is scatterable on a continuous double belt press.

"Poly(vinyl chloride)" or "PVC" means an unprocessed polymer derived from a vinyl chloride monomer and containing no additives or modifiers.

"Poly(vinyl chloride) Compound" or "PVC Compound" means a mixture that comprises predominately PVC, and optionally includes other fillers, lightweight fillers, additives, modifiers or combinations thereof, excluding chemical blowing agents or structural elements to introduce voids.

"Reclaimed Poly(vinyl chloride)" or "Reclaimed PVC" means PVC material resulting from a recycling or reclamation process and is predominately PVC.

"Reclaimed Poly(vinyl chloride) Compound" or "Reclaimed PVC Compound" means a mixture that comprises predominately reclaimed PVC and optionally includes other fillers, lightweight fillers, additives, modifiers, polymers, poly(vinyl chloride), or combinations thereof, wherein chemical blowing agents or structural elements to introduce voids, such as microbubbles or microballoons, are not added.

"Rigid Substrate" means a substrate with a flexural modulus between 1,000 MPa and 7,600 MPa as measured by ASTM D790.

"Substrate" means an object of a specific width, thickness, and length and possessing a top surface and a bottom surface, said surfaces comprising the majority of the surface area of the substrate, and four edges.

"Thermal Compression Bonding" means a polymer processing practice employing heat, pressure, and time to form polymeric articles, without necessarily requiring polymeric materials to fully melt or reach a completely liquid state.

"Unprocessed Polymer" means a polymer that has not been formed into an article or compound.

"Viscoelastic Characteristic" means that a material exhibits both viscous and elastic properties when subjected to deformation.

"Voids" mean optically-apparent gas filled space within a substrate.

The above summary is not intended to describe each disclosed embodiment or every implementation. The detailed description that follows more particularly exemplifies illustrative embodiments.

DETAILED DESCRIPTION

This disclosure is directed to the thermal compression bonding of poly(vinyl chloride) compounds and reclaimed poly(vinyl chloride) compounds to form rigid substrates that possess advantageous mechanical, physical, and aesthetic characteristics. Various embodiments possess desirable attributes for end use applications, including but not limited to low density, non-homogenous coloration, surface roughness, cupping, and combinations of these attributes. Many of these unique combinations of attributes can be achieved without the use of adhesives.

In certain embodiments, a continuous double belt press may be used as a thermal compression bonding manufacturing process. Unlike conventional polymer thermal processing methods such as extrusion, or injection molding the continuous double belt press process does not require precise melt state properties to create the resultant substrate in panel or sheet form. The continuous double belt press does not require the compounded polymer to fill a die or mold to create its shape, and consequently it is uniquely suited to handle inherently varied and inhomogeneous materials, such as the reclaimed poly(vinyl chloride) compounds of this disclosure. The continuous double belt press is capable of achieving this result because it only requires the materials to partially melt or partially liquify during its process and effectively bonds particulates of the poly(vinyl chloride) compound or reclaimed poly(vinyl chloride) compound together while controlling the optional voids under heat, pressure, and time to form a substrate. This process enables the non-homogenous and often varying composition of a reclaimed material to be effectively melt processed into a substrate in widths up to 3 meters, thicknesses ranging from 0.5 mm to 25 mm, and effectively infinite lengths.

In certain embodiments, the thermal compression bonding of particulate poly(vinyl chloride) compounds and particulate reclaimed poly(vinyl chloride) compounds results in fused substrates. The ability to create a fused substrate offers advantages in the resulting physical characteristics, such as a lowered density as compared with consolidated substrates. A reduction in density enables a reduction in the mass of material used per unit volume which results in a lower cost to manufacture and transport the substrates. Properly engineered, the lowered density substrates maintain sufficient flexural modulus to be useful for end use applications.

Figure 1:
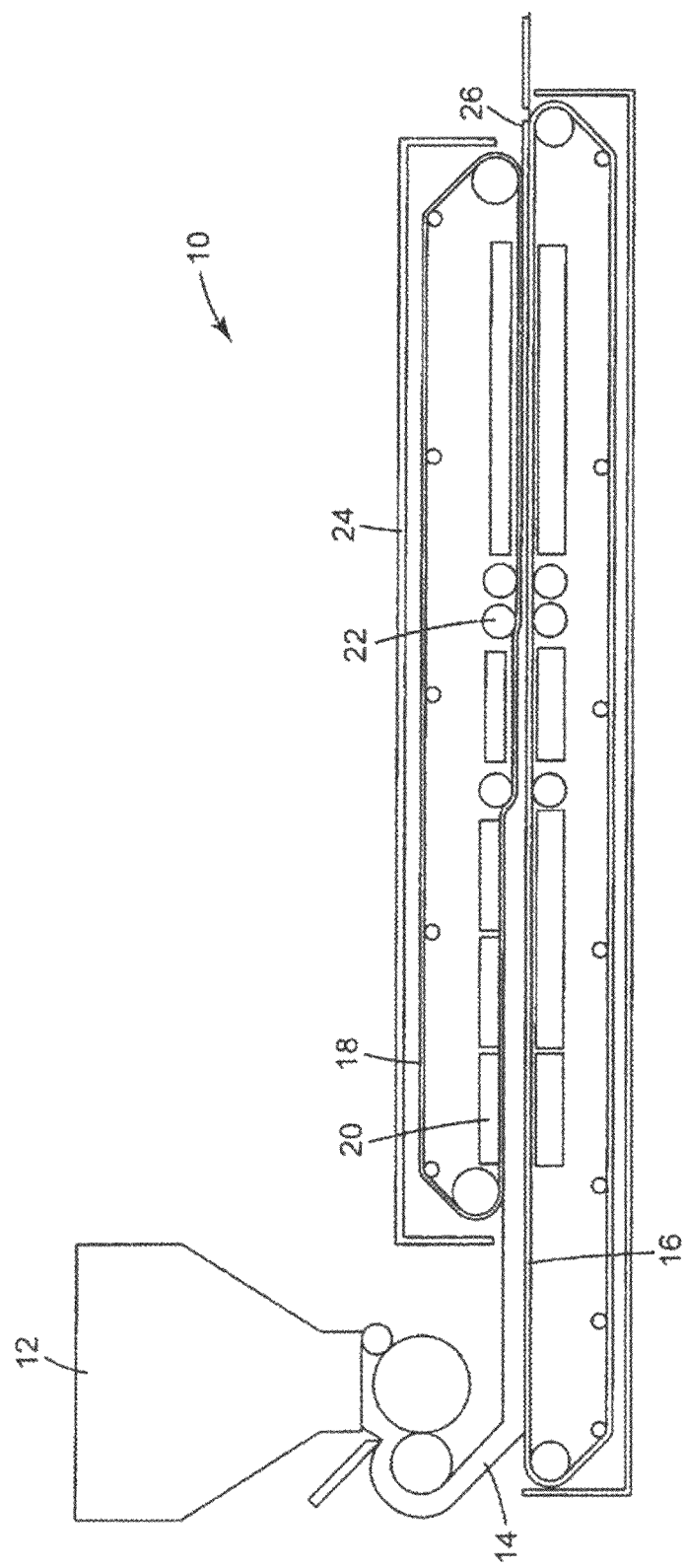
FIG. 1 is a schematic of a thermal compression bonding process representative of a continuous double belt press suitable for practicing various embodiments of the disclosure.

A schematic of a continuous double belt press process 10 is depicted in FIG. 1. A particulate scattering device 12 is employed to spread the desired poly(vinyl chloride) compound or reclaimed poly(vinyl chloride) compound as particulates 14 onto an extended lower belt 16. An upper belt 18 comes into contact with the scattered particulates 14 on the lower belt 16 near a heating zone 20. The heat provided by controlled upper and lower heating platens substantially softens or partially softens or melts the particulates 14 and with the addition of time and pressure bonds or fuses them together (not shown). Nip rolls 22 apply compressive forces to assist in the processing of the particulates 14 to a substrate 26 of indefinite length and may help orient optional high aspect ratio fillers to impart useful properties. An annealing zone 24 includes controlled temperature upper and lower cooling platens and is used to cool the substrate before it exits from belts 16 and 18. Such an apparatus is available from Sandvik-TPS GmbH (Goppingen, Germany). Upon take off of the substrate of indefinite length from the continuous double belt press, the substrates are divided into smaller substrates for end use applications.

In order for the poly(vinyl chloride) compound or the reclaimed poly(vinyl chloride) compound to be suitable for thermal compression bonding, the compound preferably should be in the form of a particulate. Conventional compounding, pelletizing, and grinding techniques are all useful practices to create suitable forms of poly(vinyl chloride) compound or reclaimed poly(vinyl chloride) compound to use as feedstock for thermal compression bonding. In certain embodiments it may be desirable for the poly(vinyl chloride) compound or the reclaimed poly(vinyl chloride) compound to be ground or formed into a particulate of a preferred size. Alternatively larger particulates can be prepared using compounding equipment such as an extruder, a pellet mill, a Pallmann Paltruder, or other such commercially available compounding equipment. The materials used to make compounds can be blended using conventional blending equipment, including a ribbon blender, v-blender or any blending equipment that can produce a uniform particulate dispersion of the components. The dry blend can be scattered or coated and processed into substrate articles using a continuous double belt press as described in this disclosure.

The reclaimed poly(vinyl chloride) can be derived from various sources such as edge trim from thermoformed PVC compound articles, scrap from PVC compound siding, scrap from PVC compound fencing, and PVC compound point of purchase signs and displays to name a few. In a preferred embodiment, the reclaimed poly(vinyl chloride) compound is comprised of reclaimed poly(vinyl chloride) that is cellular in structure. Poly(vinyl chloride), in the absence of any fillers, lightweight fillers, plasticizers, other polymers, or additives, is known in the literature to have a density of about 1.45 g/cm$^3$. Reclaimed poly(vinyl chloride), in the absence of a substantial amount of a foamed blowing agent or other lightweight fillers or plasticizers or modifiers, generally has a density of about 1.45 g/cm$^3$ or more. The reclaimed poly(vinyl chloride) compound may be used alone or with mixtures of poly(vinyl chloride) compound or even with other polymers, cellulosic material fillers, naturally occurring inorganic material fillers, lightweight fillers, modifiers, plasticizers, and additives. In some embodiments, the reclaimed poly(vinyl chloride) comprises greater than 85% by weight of the thermal compression bonded substrate.

It has been found that thermal compression bonding is one process well-suited to manufacture a substrate with poly (vinyl chloride) compound or reclaimed poly(vinyl chloride) compound where the resulting substrate exhibits the desired lower density as compared to conventionally manufactured poly(vinyl chloride) articles and remains rigid for intended end use applications. Moreover, thermal compression bonding enables a controlled amount of air to be entrapped in the substrate through the controlled application of heat, time, and pressure without the addition of density lowering additives such as blowing agents or structural elements to introduce voids, such as microbubbles or microballoons. Thus thermal compression bonding processes provide certain advantages for producing fused poly(vinyl chloride) compound and fused reclaimed poly(vinyl chloride) compound substrates.

In one embodiment, the effective use poly(vinyl chloride) compounds or reclaimed poly(vinyl chloride) compounds and the controlled engineering may result in a substrate having of up to 50% voids to lower overall density and still create a rigid substrate. The resulting rigid substrates may possess a density less than the known density of conventionally manufactured poly(vinyl chloride) articles without the use of known density-lowering additives and possess rigidity as demonstrated by a flexural modulus of about 1,000 MPa to about 7,600 MPa in accordance with ASTM D790.

In certain embodiments, the substrate has a density value that is less than or equal to 1.35 g/cm$^3$. The density of the substrates is measured using ASTM D792. In certain embodiments, the substrates are thermoformable using conventional thermoforming equipment. The low density substrates may be suitable for use as a building material, wall covering, door covering, furniture material, acoustic panel, flooring substrate, ceiling tile, a panel for recreational vehicle walls, or a base for a laminate construction.

As described in the disclosure, a poly(vinyl chloride) compound or reclaimed poly(vinyl chloride) compound may be processed into a substrate by thermal compression bonding a plurality of particulates. In one particular embodiment, thermal compression bonding is initiated by scattering particulates, formed by compounding poly(vinyl chloride), along with optional additives, fillers, lightweight fillers, poly(vinyl chloride), or combinations thereof, onto a first rotating belt. Thermal compression bonding the particulates then takes place between the first rotating belt and a second rotating belt to form a substrate. The density of the resulting substrate is a function of time, temperature and pressure used to fuse the particulates during processing that allows for a controlled amount of fusing. Particulates of various sizes and compositions can also be optionally co-scattered to further engineer desirable product features.

In another embodiment, the continuous double belt press may be operated in a manner that creates unique surface features on the resulting substrate. For example, upon scattering of the poly(vinyl chloride) compound particulates or the reclaimed poly(viny chloride) compound particulates onto the lower belt of a continuous double belt press, vibrating forces may be used to at least partially segregate the various particulates by size before contacting the particulates with the upper belt to apply pressure. The finer particulates of reclaimed poly(vinyl chloride) compound or poly(vinyl chloride) compound migrate closer to the lower belt and the larger particulates of reclaimed poly(vinyl chloride) compound or poly(vinyl chloride) compound migrate closer to an upper surface of the scattered particulates on the lower belt. Subsequently, by controlling the temperatures of the upper and lower belts and limiting the pressure exerted by the upper belt of the double belt press, particulates on the bottom are fused while the predominately larger particulates on the top are bonded but not fully compressed into the substrate, thereby leaving a rough top surface on the substrate wherein the particulates on the top surface have substantially maintained their original shape.

Figure 2:
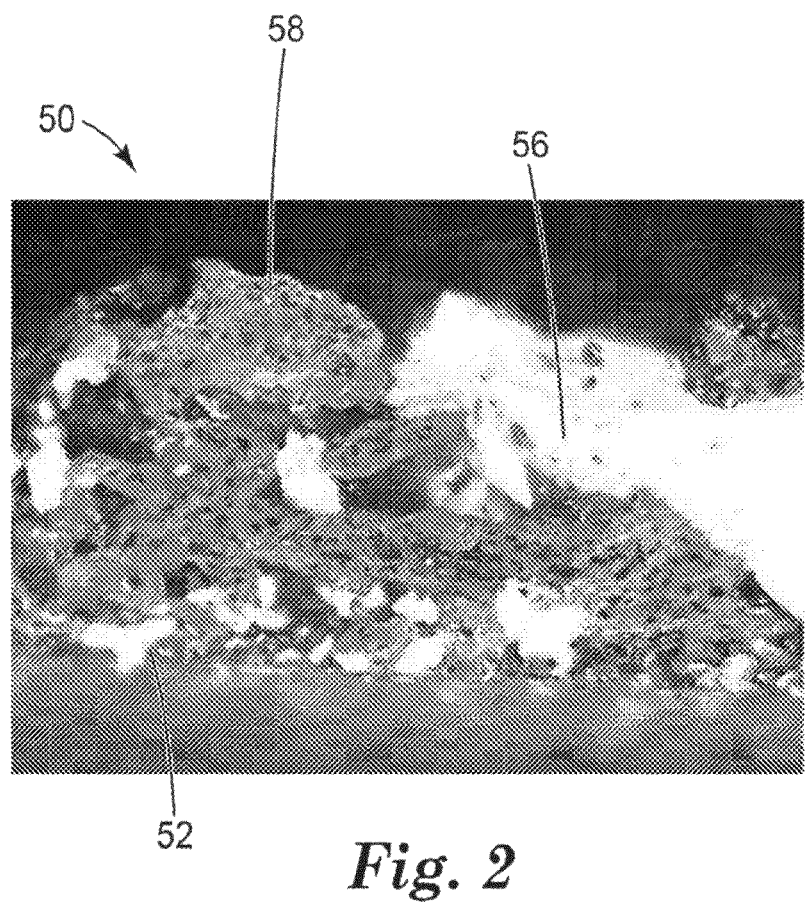
FIG. 2 is a photograph of a cross section of a substrate demonstrating varying consolidation levels moving from one surface of the substrate to an opposing surface.

FIG. 2 depicts a cross sectional view of an embodiment produced with this technique. The substrate 50 exhibits a generally fused thickness 52 near the bottom surface 54 and a transition to a non-consolidated surface 56 on the top surface 58. In one embodiment, the cross-section of the substrate comprises a fused surface with an average height of at least 0.2 mm and up to 5 mm and comprises 0.5% to 50% of the substrates total thickness and further comprises a non-consolidated surface wherein the total substrate has a thickness of 2 to 25 mm. Other techniques for imparting desired textures on a surface of the substrates, such as the use of textured belts on the continuous double belt press or the use of embossing rollers, are known to those skilled in the art and therefore not elements of the invention disclosed but may be suitable with certain practices of this disclosure.

Another optional embodiment involves co-scattering particulates of reclaimed poly(vinyl chloride) compound or poly(vinyl chloride) compound having different characteristics. In certain embodiments, particulates of a first reclaimed poly(vinyl chloride) compound or poly(vinyl chloride) compound are scattered first and subsequently particulates of a second reclaimed poly(vinyl chloride) compound or poly(vinyl chloride) compound are scattered second and possess different characteristics such as a different color, differences in particulate size, modulus, specific gravity, thermal expansion coefficient, or combinations thereof. Non-limiting examples include, a first scattering with a black colored, reclaimed poly(vinyl chloride) compound and a second scattering with a reclaimed white colored poly(vinyl chloride) compound to form a substrate having one surface that is black and one surface that is white. A non-homogeneous colored substrate manufactured with this method enables the substrate to be used in such a manner as to display the preferred surface. The benefit is an article that has multiple appearances and does not require adhesives to bond the particulates from each scatter together. The single-step and continuous nature of the process can further enable cost-savings.

For purposes of this disclosure, the first and second scattering, upon formation of the substrate, may not appear as distinct and separate layers. The particulates tend to co-mingle at the interface and therefore, in some instances, there is a transition in the substrate from one type of particulate to the other. In certain cases it may be more preferable to scatter a particulate with a desired feature first or second.

In another optional feature of this disclosure, thermal compression bonding is used to form a reclaimed poly(vinyl chloride) compound substrate with non-homogenous color or a poly(vinyl chloride) compound substrate with non-homogeneous color by simultaneously forming the substrate and attaching a film on one surface or both surfaces of the substrate in a continuous process. Preferably, the film is attached without the use of an adhesive. In one embodiment, a film of a desired color, pattern, or aesthetic feature is positioned on the lower belt before the scattering of the reclaimed poly(vinyl chloride) compound or poly(vinyl chloride) compound particulates and subsequently processed in the continuous double belt press as previously described. In another embodiment, reclaimed poly(vinyl chloride) compound or poly(vinyl chloride) compound particulates are scattered on the lower belt of the continuous double belt press, a film of desired color, pattern, or aesthetic feature is positioned above the scattered particulates, and subsequently processed in the continuous double belt press. Alternatively, a first film of a desired color, pattern, or aesthetic feature is positioned on the lower belt, reclaimed poly(vinyl chloride) compound or poly(vinyl chloride) compound particulates are scattered onto the first film, a second film of a desired color, pattern, or aesthetic feature is positioned above the scattered particulates, and subsequently processed in the continuous double belt press as previously described. In another embodiment, the film can be used to homogenize color variations that may be inherent in the reclaimed poly(vinyl chloride). When the objective is to homogenize the surface color, a film similar in color to the scattered particulates is preferred. In another embodiment, two films can be used to add unique or desired design, color, or aesthetic features to both surfaces of the substrate wherein the two films may be the same or different.

In another embodiment, particulates may be scattered on top of a film of poly(vinyl chloride) having a desired color, pattern, aesthetic feature, wear resistance feature, or combination thereof. In another embodiment, it is disclosed that a wear layer film can be placed first, followed by a colored, patterned, or aesthetic layer, followed by a layer of scattered reclaimed poly(vinyl chloride) compound or poly(vinyl chloride) compound. For example, a poly(vinyl chloride) compound substrate can be manufactured in a single step to have a wear layer-protected surface with the appearance of wood grain for a flooring application. The composition and method of manufacture of the single film and the double film substrates are distinguished from the lamination of a film or films onto a reclaimed poly(vinyl chloride) compound or poly(vinyl chloride) compound substrate by the fact that embodiments of this disclosure may utilize a continuous, single step process that does not require an adhesive and that does not require a preformed reclaimed poly(vinyl chloride) compound or poly(vinyl chloride) compound substrate. Optionally, in some of the embodiments it can be preferred to use a belt that allows gases to escape through the belt so as to minimize any aesthetic impact such gases may impart to a surface.

Optionally, reclaimed poly(vinyl chloride) compound or poly(vinyl chloride) compound substrates may be engineered to possess a permanent and controlled cupping or bow. This feature is generated through the use of a cooling step wherein the substrate is cooled between a controlled thickness to address the degree of cupping within a thermal compression bonding apparatus, and in some embodiments a continuous double belt press. In certain embodiments, the substrate has a degree of cupping that is at least 0.15% and up to 5%. For example, a substrate of width 610 mm and length 610 mm can be manufactured to cup upwards from 1 to 30 mm at the four corners when placed concave side up on a flat surface.

Cupping may have utility in certain applications such as ceiling tiles, upon which gravity exerts a constant downward force that can be balanced by the tile's degree of cupping to cause the tile to have a substantially horizontal and flat orientation, instead of a sagging orientation, when in use. Reclaimed poly(vinyl chloride) compound or poly(vinyl chloride) compound may be used. The single scatter cupping does not require added fillers, balancing or opposing layers, or a subsequent heat treatment step to affect cupping. The controlled cupping method leverages the unique features of the continuous double belt press process and has utility for other polymer compounds. The degree of cupping is controlled by the temperature, pressure, platen gap spacing, and time in the annealing zone. It has been found that the space between the upper and lower cooling platens and the temperature of the cooling platens within the annealing zone can be used to control the degree of cupping.

In one embodiment, a substrate with controlled cupping can be formed by elevating the upper cooling platens a preferred distance from the lower cooling platens, upon which the lower belt rests, thereby enabling cooling the substrate in a less physically constrained manner to created a desired degree of cupping. In one embodiment, reclaimed poly(vinyl chloride) compound or poly(vinyl chloride) compound particulates are scattered on the lower belt of a continuous double belt press and formed into a fused substrate through the use of controlled temperature, pressure, and time. Within the annealing zone the upper cooling platen is separated from the lower cooling platen by at least 1 mm more than the thickness of the substrate. In certain embodiments, particulates of a first reclaimed poly(vinyl chloride) compound or poly(vinyl chloride) compound are scattered first and subsequently particulates of a second reclaimed poly(vinyl chloride) compound or poly(vinyl chloride) compound are scattered second and possess a different color. Non-limiting examples include, a first scattering with particulates of a black, reclaimed poly(vinyl chloride) compound and a second scattering with particulates of a white poly(vinyl chloride) compound to form a substrate having a bottom surface that is black and a top surface that is white and which cups in the direction of the white surface. The use of a colored film can also be utilized for aesthetic purposes.

Cupping may also be introduced by using two scatterings wherein reclaimed poly(vinyl chloride) compound or poly(vinyl chloride) compound associated with each scattering possesses a different coefficient of thermal expansion (CTE). In one embodiment, particulates of a first reclaimed poly(vinyl chloride) compound or poly(vinyl chloride) compound are scattered first and subsequently particulates of a second reclaimed poly(vinyl chloride) compound or poly(vinyl chloride) compound are scattered second and possess a different coefficient of thermal expansion and possibly other differences such as color, particulate size, modulus, specific gravity, or combinations thereof. After processing in the continuous double belt press, the cooled substrate will have a concave surface that will be the same surface as the higher CTE layer and therefore the substrate in this embodiment will cup toward the top surface or cup toward the bottom surface, depending on whether the high CTE layer is on the top surface or the bottom surface. Non-limiting examples include, a first scattering with particulates of a lower CTE, white colored, reclaimed poly(vinyl chloride) compounded with wood or mineral filler and a second scattering with particulates of a higher CTE, black colored, reclaimed poly(vinyl chloride) compound to form a substrate having one surface that is black and one that is white and which cups toward the black, higher CTE, surface. This method can also be used to control the degree of cupping with other polymer pairings.

Literature values for the CTE of unprocessed polymers as well as vendor-provided CTE values for compounded polymers can be used to determine suitable material pairings to enable this embodiment. The CTE of PVC compounds and reclaimed PVC compounds can be determined according the Thermal Expansion Coefficient test. The test is performed by cutting nominally 125 cm square samples, measuring their length and width with a micrometer, heating them to 70° C. for one hour and then allowing them to cool to room temperature for at least one hour. Their length and widths are again measured with a micrometer to determine any contraction. The samples are then again heated to 70° C. and after one hour their length and width are measured immediately after removing them from the oven to determine their CTE in units of m/(m*C) by dividing the change in dimension by the original value and the change in temperature.

The reclaimed poly(vinyl chloride) compounds or poly(vinyl chloride) compounds of this disclosure may be combined with additives to achieve specific properties or characteristics, such as but not limited to flame resistance, flexibility, wear resistance, stability to ultraviolet light, coefficient of thermal expansion, or coloration. Non-limiting examples of additives contemplated by this disclosure include inorganic fillers, organic fillers, high aspect ratio fillers, lightweight fillers, cellulosic materials, modifiers, naturally occurring inorganic materials, coupling agents, lubricants, antimicrobials, inorganic antioxidants, light stabilizers, fibers, antiblocking agents, heat stabilizers, impact modifiers, biocides, compatibilizers, flame retardants, plasticizers, pigments, colorants, processing aids, lubricants, pigments, and other plastics, or combinations thereof. Additives may be included in the reclaimed poly(vinyl chloride) compounds or the poly(vinyl chloride) compounds in amounts ranging from 2 to 80% by total weight. Expanded volcanic ash, calcium carbonate, wood flour, talc, cork, plasticizers, or cellulosic fibers or combinations thereof may be particularly desirable for certain embodiments, especially for uses such modifying the coefficient of thermal expansion, lowering the overall cost, changing the modulus, adjusting the density or combinations thereof. The amount and type of conventional additives in the composition may vary depending upon the scope of mixing and the desired physical properties of the finished substrate. Those skilled in the art are capable of selecting appropriate amounts and types of additives to achieve specific properties The resulting substrates or sheets of the thermally compression bonded reclaimed poly(vinyl chloride) compound or poly(vinyl chloride) compound may be employed for a variety of end use applications in part due to their physical and chemical characteristics. The substrate is durable, moisture resistant, stiff, bondable, thermoformable and possesses a low thermal expansion coefficient as well as the inherent flame retardant properties of poly(vinyl chloride) compound. In some embodiments, the substrate exhibits water absorption of less than 10%, and usually less than 1% as indicated after submersion in water for twenty-four hours at room temperature.

In other embodiments, the substrate is ideally suited for thermoforming applications. Those of ordinary skill in the art of thermoforming poly(vinyl chloride) compound are capable of selecting substrates of the appropriate thickness and composition to meet the specific demands of a given application. Other non-limiting examples include a flooring substrate, a roofing panel, a ceiling tile, a ceiling air diffuser, an outdoor article, a marine panel, a concrete form, a wall panel, a door panel, an automotive panel, an aerospace panel, a recreational vehicle side wall, front wall or back wall component, or a signage panel. Various embodiments of this disclosure may be combined into a single embodiment, such as have been described in this disclosure. For example, co-scattering of different color particulates of reclaimed poly(vinyl chloride) compound or poly(vinyl chloride) compound may be used to form a substrate with non-homogeneous color wherein the substrate is low density, thermoformable, cupped, or a combination thereof. As another non-limiting example, a low density reclaimed poly(vinyl chloride) compound substrate or poly(vinyl chloride) substrate with a colored film on one surface may be continuously manufactured without need for an adhesive using a continuous double belt press.

EXAMPLES

TABLE 1

MATERIALS

| MATERIAL | DESCRIPTION |
|---|---|
| #1) Pulverized White Reclaimed Poly(vinyl chloride) | Pulverized 100% Reclaimed White PVC commercially available from Jamplast Corporation. |
| #2) Pulverized Black Reclaimed Poly(vinyl chloride) | Pulverized 100% Reclaimed Black PVC commercially available from Jamplast Corporation. |
| #3) White PVC film | Alkorfol HO, an opaque, 1270 mm wide, white 0.08 mm thick calendared PVC film commercially available from Renolit. |

Example 1

Material #2 of Table 1 was converted into a pulverized particulate using a Reduction Engineering pass grinder with a 2 mm gap between the blades. The particulate was made into a homogeneous, fused PVC sheet article using a continuous double belt press. The continuous double belt press (CDBP) was made by Sandvik-TPS of Goppingen, Germany. It has three heating zones each having a length of approximately 5 meters and two cooling zones each having a length of approximately 5 meters. The total length of the combined heating and cooling zones, which includes length for nip rollers and other mechanical equipment is approximately 27 meters. Prior to the heating and cooling zones are positioned two scattering units that are capable of applying a precise amount of powder or pellets across a distance of up to 1.5 meters. For this example Material #2 was scattered onto a Teflon-coated belt that was moving at 3 m/minute. In this example only one scattering unit was used. The height of the scattered particulate after scattering onto the Teflon-coated belt was about 13 mm. The CDBP was set such that the temperature in the first heating zone was 220° C. for both the upper and lower heating platens, the second heating zone was set to a temperature of 220° C. for both the upper and lower heating platens, the third heating zone was set to 220° C. for both the upper and lower heating platens. Both cooling zones were set to 20° C. for the upper and lower cooling platens. Immediately following heating zone one a 2 bar pressure was set to a 15 cm diameter nip roller. Following the application of nip pressure the material passed through the remaining heating zones and the sample entered the first cooling zone which was set to 40° C. for both the upper and lower cooling platens while the second cooling zone was set to 20° C. for both the upper and lower cooling platens. The gap between the platens was 15 mm in heating zone 1, 13 mm in heating zone 2, and 8mm in heating zone 3 and in both cooling zones. The resultant sheet article had a thickness of 3 mm and a density as determined by a buoyancy method in accordance with ASTM D792 and was determined to be 1.25 g/cm$^3$. The substrate had a flexural modulus of about 2760 MPa in accordance with ASTM D790.

Example 2

Materials #1 and #2 of Table 1 were converted into a pulverized particulate using a Reduction Engineering pass grinder with a 2 mm gap between the blades. The two particulates were used to make a non-homogeneous colored, fused PVC sheet article using the continuous double belt press described in Example 1. For this example Material #1 was scattered onto a Teflon-coated belt that was moving at 4 m/minute from a first scattering unit and Material #2 was scattered on top of Material #1 using a second scattering unit. In this example two scattering units were used in sequence. The first scattering unit was set to enable about 20% of the total material scattered to be Material #1 while the second scattering unit was set to enable about 80% of the total material to be scattered to be Material #2. The total height of the scattered particulates after scattering from both scattering units onto the moving Teflon-coated belt was about 13 mm. The CDBP was set such that the temperature in heating zone one was 220° C. for both the upper and lower heating platens, the second heating zone was set to a temperature of 220° C. for both the upper and lower heating platens, the third heating zone was set to 220° C. for both the upper and lower heating platens. Cooling zone one was set to 70° C. for the upper and lower cooling platens. Cooling zone two was set to 55° C. for the upper and lower cooling platens. Immediately following the heating zones the 61 cm diameter powered nip roller was raised 25 cm and the 15 cm diameter nip roller immediately following had 0.5 bar of pressure. The gap between the platens was 15 mm in heating zone 1, 10 mm in heating zone 2, and 3 mm in heating zone 3 and in both cooling zones. The resultant sheet had a thickness of 2.85 mm. No adhesive was used. The resultant substrate was found to possess a non-homogeneous color that included a white color on one surface and a black color on the opposite surface. The color throughout the thickness varied.

Example 3

Material #1 of Table 1 was converted into a pulverized particulate using a Reduction Engineering pass grinder with a 2 mm gap between the blades. The CDBP described in Example 1 was used. For this example, Material #3 was unwound onto the lower Teflon-coated belt. Material #1 was scattered from a scattering unit unto Material #3, which was above the Teflon-coated lower belt. The Teflon-coated belt was moving at 4 m/minute. The height of the particulate scattered onto Material #3 was about 9 mm. The CDBP was set such that the temperatures in heating zones one, two, and three were 235° C. on the upper heating platens and 225° C. on the lower heating platens. The first cooling zone was set to 40° C. for the upper and lower cooling platens. The second cooling zone was set to 30° C. for the upper and lower cooling platens. Immediately following heating zone one the 15 cm diameter nip roller was set to 0.1 bar. Immediately following heating zone three the 15 cm nip roller was set to 4 bar. The 61 cm diameter powered nip roller that immediately followed was set to 3 bar. The gap between the platens was 7.5 mm in heating zone 1, 4.5 mm in heating zone 2, 4.5 mm in heating zone 3, and 1.4 mm in both cooling zones. The resultant sheet had a thickness of 1.5 mm and a uniform white color. No adhesive was used.

Example 4

For this example, Material #1 of Table 1 was converted into a pulverized particulate using a Reduction Engineering pass grinder with a 2 mm gap between the blades. The CDBP described in Example 1 was used. Material #1 was scattered from a scattering unit onto the Teflon-coated lower belt that was moving at 4 m/minute. The height of the scattered particulate was about 10 mm. The CDBP was set such that the temperatures in heating zones one, two, and three were 235° C. in the upper heating platens and 225° C. in the lower heating platens. Cooling zone one was set to 60° C. for the upper and lower cooling platens. Cooling zone two was set to 40° C. for the upper and lower cooling platens. Immediately following heating zone one the 15 cm diameter nip roller was set to 0.1 bar. Immediately following heating zone three the 15 cm nip roller was set to 4 bar. The 61 cm diameter powered nip roller that immediately followed was set to 3 bar. The gap between the platens was 7.5 mm in heating zone 1, 4.5 mm in heating zone 2, 4.5 mm in heating zone 3, and 1.4 mm in both cooling zones. The resultant cupped sheet had a thickness of 1.6 mm and the degree of cupping was determined to be 0.76%.

Example 5

For this example, Material #1 of Table 1 was converted into a pulverized particulate using a Reduction Engineering pass grinder with a 2 mm gap between the blades. The CDBP described in Example 1 was used. Material #1 was scattered from a scattering unit onto the Teflon-coated lower belt that was moving at 4 m/minute. The height of the Material 1 particulate scattered was about 10 mm. The CDBP was set such that the temperatures in heating zones one, two, and three were 230° C. in the upper heating platens and 225° C. in the lower heating platens. Cooling zone one was set to 45° C. for the upper and lower cooling platens. Cooling zone two was set to 25° C. for the upper and lower cooling platens. Immediately following heating zone one the 15 cm diameter nip roller was set to 0.1 bar. Immediately following heating zone three the 15 cm nip roller was set to 4 bar. The 61 cm diameter powered nip roller that immediately followed was set to 3 bar. The gap between the platens was 8.5 mm in heating zone 1, 4.5 mm in heating zone 2, 4.5 mm in heating zone 3, and 1.9 mm in both cooling zones. The resultant cupped sheet had a thickness of 1.9 mm and the degree of cupping was determined to be 1.32%.

Examples 6

For this example, Material #2 of Table 1 was converted into a pulverized particulate using a Reduction Engineering pass grinder with a 2 mm gap between the blades. Additionally, a Material #4 pulverized particulate was created by blending 90 parts by weight of pulverized Material #2 with 10 parts by weight of Maple Flour 4010 commercially from American Wood Fibers and then making a compounded pellet using a Pallmann Palltruder Model 250. The Material #4 compounded pellet was subsequently made into a pulverized particulate using a Reduction Engineering pass grinder with a 2 mm gap between the blades. The Material #2 and Material #4 particulates were used to make a fused PVC sheet article having materials with different CTEs on each surface using the continuous double belt press described in Example 1. Material #2 was scattered onto a Teflon-coated belt that was moving at 4 m/minute from a first scattering unit and Material #4 was scattered on top of Material #2 using a second scattering unit. In this example two scattering units were used in sequence. The first scattering unit was set to enable about 50% of the total material scattered to be Material #2 while the second scattering unit was set to enable about 50% of the total material to be scattered to be Material #4. The total height of the scattered particulates after scattering from both scattering units onto the moving Teflon-coated belt was about 11 mm. The CDBP was set such that the temperature in each of the three heating zones was 235° C. in the upper heating platens and 225° C. in the lower heating platens. The first cooling zone was set to 55° C. for the upper and lower cooling platens and the second cooling zone was set to 35° C. for the upper and lower cooling platens. Immediately following heating zone one the 15 cm diameter nip roller was set to 0.1 bar. The 61 cm diameter powered nip roller that follows the heating zones was raised 5 cm and the pressure was set was 4 bar. The 15 cm nip roller following the 61 cm diameter powered nip roller was set to 4 bar. The gap between the platens was 8.5 mm in heating zone 1, 4.8 mm in heating zone 2, 4.8 mm in heating zone 3, and 2 mm in both cooling zones. The resultant cupped sheet had a thickness of 2 mm and the degree of cupping was determined to be 2.81%.

Example 7

A multi-colored reclaimed PVC available in chip form, Material #5, from Jamplast Corporation has particulates ranging in size from a 15 mm in length to powder. The majority of the particulates have a length and width size of 5 mm or less. The material was scattered to a height of about 17 mm onto a lower belt of a continuous double belt press. The continuous double belt press described in Example 1 was used. In this example the vibrating table was set at 30. The CDBP was set such that the temperature in each of the three heating zones was 220° C. in the upper heating platens and 220° C. in the lower heating platens. Both of the cooling zones were set to 20° C. for the upper and lower cooling platens. The gap between the platens was 14.5 mm in heating zone 1, 9.5 mm in heating zone 2, 6 mm in heating zone 3, and 4 mm in both cooling zones. The resultant sheet with a non-consolidated surface had a maximum total thickness of 4 mm and was found to possess a fused bottom surface and a non-consolidated top surface. Optical measurement of cross-section showed the fused bottom surface to represent about 10% to 20% of the maximum total thickness. The thickness of the non-consolidated surface comprised the remainder of the sample.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described and variations apparent to one skilled in the art may be included within the invention defined by the claims. The invention illustratively disclosed herein suitably may be practiced, in some embodiments, in the absence of any element which is not specifically disclosed herein.

What is claimed is:

1. An article comprising a substrate derived from thermal compression bonding a particulate poly(vinyl chloride) compound or a particulate reclaimed poly(vinyl chloride)

compound, the substrate having voids to provide a density less than or equal to 1.35 g/cm$^3$ as measured by ASTM D792, and a flexural modulus of about 1,000 MPa to about 7,600 MPa as measured by ASTM D790.

2. An article according to claim 1, wherein the substrate comprises greater than 85% by weight of reclaimed poly(vinyl chloride).

3. An article according to claim 1, wherein the substrate possesses non-homogeneous color.

4. An article according to claim 1, wherein the substrate is thermoformable.

5. An article according to claim 1, wherein the substrate comprises a building material, wall covering, door covering, furniture material, acoustic panel, ceiling tile, a panel for recreational vehicle walls, or a base for a laminate construction.

6. An article according to claim 1, further comprising a film on at least one surface of the substrate wherein the film is added before the thermal compression bonding.

7. An article according to claim 1, further comprising inorganic fillers, organic fillers, high aspect ratio fillers, lightweight fillers, cellulosic materials, modifiers, naturally occurring inorganic materials, coupling agents, lubricants, antimicrobials, inorganic antioxidants, light stabilizers, fibers, antiblocking agents, heat stabilizers, impact modifiers, biocides, compatibilizers, flame retardants, plasticizers, pigments, colorants, processing aids, lubricants, pigments, and other plastics, or combinations thereof.

8. A method comprising:
(a) providing a particulate poly(vinyl chloride) compound or particulate reclaimed poly(vinyl chloride) compound,
(b) scattering the particulate poly(vinyl chloride) compound or the reclaimed poly(vinyl chloride) particulate compound onto a lower belt of a double belt press,
(c) co-scattering a second particulate poly(vinyl chloride) compound or a second particulate reclaimed poly(vinyl chloride) compound;
(d) contacting and thermal compression bonding the particulate poly(vinyl chloride) compound or the particulate reclaimed poly(vinyl chloride) compound and second particulate poly(vinyl chloride) compound or second particulate reclaimed poly(vinyl chloride) compound with an upper belt on a double belt press to form a substrate having voids to provide a density of less than 1.35 g/cm$^3$ as determined by ASTM D792 and a rigidity demonstrated by a flexural modulus of about 1,000 MPa to about 7,600 MPa in accordance with ASTM D790; wherein the second particulate poly(vinyl chloride) compound or the second particulate reclaimed poly(vinyl chloride) compound have a different coefficient of thermal expansion than the particulate poly(vinyl chloride) compound or the particulate reclaimed poly(vinyl chloride) compound and the substrate exhibits a degree of cupping of at least 0.15% and up to 5%.

9. A method according to claim 8, further comprising (i) applying a film to the lower belt prior to (b) or (ii) applying a film over the scattered particulate poly(vinyl chloride) compound or particulate reclaimed poly(vinyl chloride) compound prior to (d) or both (i) and (ii) to form a multilayered substrate.

10. A method according to claim 8, further comprising cooling the substrate during thermal compression bonding, wherein the cooling includes cooling platens and the cooling platens are gapped at least 1 mm greater than the thickness of the substrate.

11. A method comprising:
(a) providing a particulate poly(vinyl chloride) compound or particulate reclaimed poly(vinyl chloride) compound having particulates comprising a range of sizes and shapes,
(b) scattering the particulate poly(vinyl chloride) compound or the particulate reclaimed poly(vinyl chloride) compound onto a lower belt of a double belt press,
(c) co-scattering a second particulate poly(vinyl chloride) compound or a second particulate reclaimed poly(vinyl chloride) compound;
(d) applying vibrating forces to at least partially segregate particulates according to size, wherein smaller particulates migrate closer to the lower belt,
(e) contacting the particulates with an upper belt on a double belt press wherein the compression forces on the upper belt of the double belt press are limited,
(f) thermal compression bonding the particulates to form a substrate wherein the particulates nearest the lower belt are fused and the particulates nearest the upper belt form a non-consolidated surface,
wherein the second particulate poly(vinyl chloride) compound or the second particulate reclaimed poly(vinyl chloride) compound have a different coefficient of thermal expansion than the particulate poly(vinyl chloride) compound or the particulate reclaimed poly(vinyl chloride) compound and the substrate exhibits a degree of cupping of at least 0.15% and up to 5%.

12. A method according to claim 11, wherein the substrate comprises a fused surface with an average height of at least 0.2 mm and up to 5 mm and further comprises a non-consolidated surface wherein the total substrate has a thickness of 2 mm to 25 mm.

13. A method comprising,
(a) scattering a particulate poly(vinyl chloride) compound or a particulate reclaimed poly(vinyl chloride) compound onto the lower belt of a double belt press,
(b) co-scattering a second particulate poly(vinyl chloride) compound or a second particulate reclaimed poly(vinyl chloride) compound;
(c) contacting the particulates with an upper belt on a double belt press and thermal compression bonding the particles to form a substrate, and
(d) cooling the substrate during thermal compression bonding, wherein the cooling includes cooling platens and the cooling platens are gapped at least 1 mm greater than the thickness of the substrate, wherein the substrate upon cooling exhibits a controlled degree of cupping of at least 0.15% and up to 5%,
wherein the second particulate poly(vinyl chloride) compound or the second particulate reclaimed poly(vinyl chloride) compound have a different coefficient of thermal expansion than the particulate poly(vinyl chloride) compound or the particulate reclaimed poly(vinyl chloride) compound.

14. A method according to claim 13, wherein the substrate possesses non-homogeneous color.

* * * * *